May 22, 1962 R. A. KLEIST 3,036,295

SIGNALLING SYSTEM

Filed March 17, 1960 2 Sheets-Sheet 1

INVENTOR.
ROBERT A KLEIST

BY Edward A. Robinson
ATTORNEY

INVENTOR.
ROBERT A KLEIST
BY Edward A. Robinson
ATTORNEY

United States Patent Office 3,036,295
Patented May 22, 1962

3,036,295
SIGNALLING SYSTEM

Robert A. Kleist, Sunnyvale, Calif., assignor to General Precision, Inc., a corporation of Delaware Filed Mar. 17, 1960, Ser. No. 15,597
7 Claims. (Cl. 340—258)

This invention relates to signalling systems, and more particularly to a novel single sideband transmission system. The invention has especial advantage when embodied in particular interrogator-responder systems, but also numerous advantages in certain telemetering applications.

An improved interrogator-responder signalling system is disclosed in appl. Ser. No. 739,909, which was filed June 4, 1958, by Clarence S. Jones and assigned to the same assignee as the present invention. The system is capable of electronically transmitting data between an interrogator device and one or more passive responder devices, where the two are capable of relative motion, so that signals may be provided from the responder which uniquely identify the responder and, or instead, indicate one or more conditions associated with the responder. One exemplary disclosed application of this prior invention is the use of passive responder devices on vehicles, such as railroad box cars, for the purpose of identifying each vehicle as it passes along a track adjacent to which an interrogator unit is located. The responder devices may be small and inexpensive, and being passive, no wired power sources or power cells are needed. Due to a number of reasons considered in detail in previous applications, these prior systems are more accurate and reliable and have much more system capacity than other prior art systems. Signalling system apparatus of this general type is marketed under the trademark "Tracer" by the assignee of this application.

Single side band (SSB) transmission systems of various types are known. Such systems are regarded as superior to double sideband (DSB) systems in that SSB systems require less bandwidth to transmit an equal amount of information. A savings in spectrum not only allows provision of additional radio facilities, but also increases the efficiency of the narrowed systems, since a reduction in bandwidth provides a marked power increase in a system tuned circuit. A conventional DSB amplitude modulation transmission system having a carrier frequency of 200 kilocycles requires a bandwidth of 10 kc. if audio frequencies between zero and 5 kc. are to be modulated thereon. If converted to a SSB system, a bandwidth of only 5 kc. is required.

In the embodiment of signalling apparatus disclosed in appl. Ser. No. 739,909, an interrogator unit, essentially a transmitter-modulator unit, supplies to an output coil a high frequency interrogator signal comprising a carrier having a plurality of low frequency or audio sub-carriers modulated on it. A responder, when located within the effective field of the interrogator signal, as when a boxcar carrying a responder nears the interrogator output coil, operates to demodulate the high frequency carrier to provide power to operate an oscillator in the responder, thereby to provide a high frequency response signal on a different high frequency. Each responder also operates on the low frequency sub-carriers obtained by demodulation of the interrogator signal, and selectively filters out or selectively preserves certain of the audio sub-carriers, so as to provide a different group of audio sub-carriers which are used to modulate the response carrier, thereby providing sub-carrier modulation on the response carrier from each responder which is unique to the particular responder. By demodulating the response signal at a response receiver and determining which sub-carriers are present or which are absent, the identity of the responder may be determined. The response receiver may be located near the stationary interrogator, for example, so that the identity of passing box cars becomes known at a stationary response receiver location.

The possibilities of using usual SSB techniques are probably routinely considered with respect to all communications systems using modulated carriers, and the bare idea of applying usual single sideband techniques to the system of appl. Ser. No. 739,909, is not a part of the present invention. I have discovered that a departure from usual SSB techniques and provision of a novel type of SSB transmission system has important additional advantages.

Single sideband signals conventionally have been generated in two different ways. The most common technique has been to modulate a carrier frequency with a conventional modulator, thereby providing the carrier with double sideband (DSB) modulation, then filtering off the undesired sideband, and/or sometimes the carrier. An alternative prior technique involves modulating the carrier in a system of balanced modulators which is arranged not to produce the undesired sideband in its output. In either case modulators have been required, and if either SSB modulation scheme were applied to the passive signalling systems of appl. Ser. No. 739,909, (1) modulator circuitry would be provided, and (2) sub-carriers required to modulate the interrogator carrier would have to be generated, as by means of low frequency or audio sub-carrier oscillators.

All SSB transmitter techniques of which I am aware involve the use of a continuous band of the spectrum, probably because voice transmission, for which these techniques are usually employed, usually requires use of a continuous band in order for speech to be intelligible. The passive signalling system of appl. Ser. No. 739,909, however, need not use a continuous band for sub-carriers, and, in fact, an important feature of the system insuring accuracy of identification is that data transmitted by the system depends only upon the presence or absence of the various discrete and separate sub-carriers, and not upon the value of frequency or the particular amplitude of any of the sub-cariers. Therefore, instead of using conventional SSB modulator techniques to provide a continuous band SSB signal, I provide a synthetic SSB signal consisting of discrete and separate high frequency carriers, and rather than using audio sub-carrier generators to feed a modulator to modulate a carrier, I instead directly generate in effect a plurality of high frequency signals and additively superimpose them in an amplifier, eliminating the need for modulators and allowing the sidebands to be provided by means of high frequency oscillators instead of low frequency oscillators.

The present invention is not restricted to use with interrogator-passive responder equipment of the type mentioned, however, and it will find use in improved telemetering equipment of further types to be described below.

It is therefore a primary object of the present invention to provide an improved transmission system for use with interrogator-passive responder signalling systems, so as to eliminate requirements for transmitter modulator equipment and to allow provision of low frequency sub-carrier signals by means of high frequency signal generator apparatus.

Figure 1:
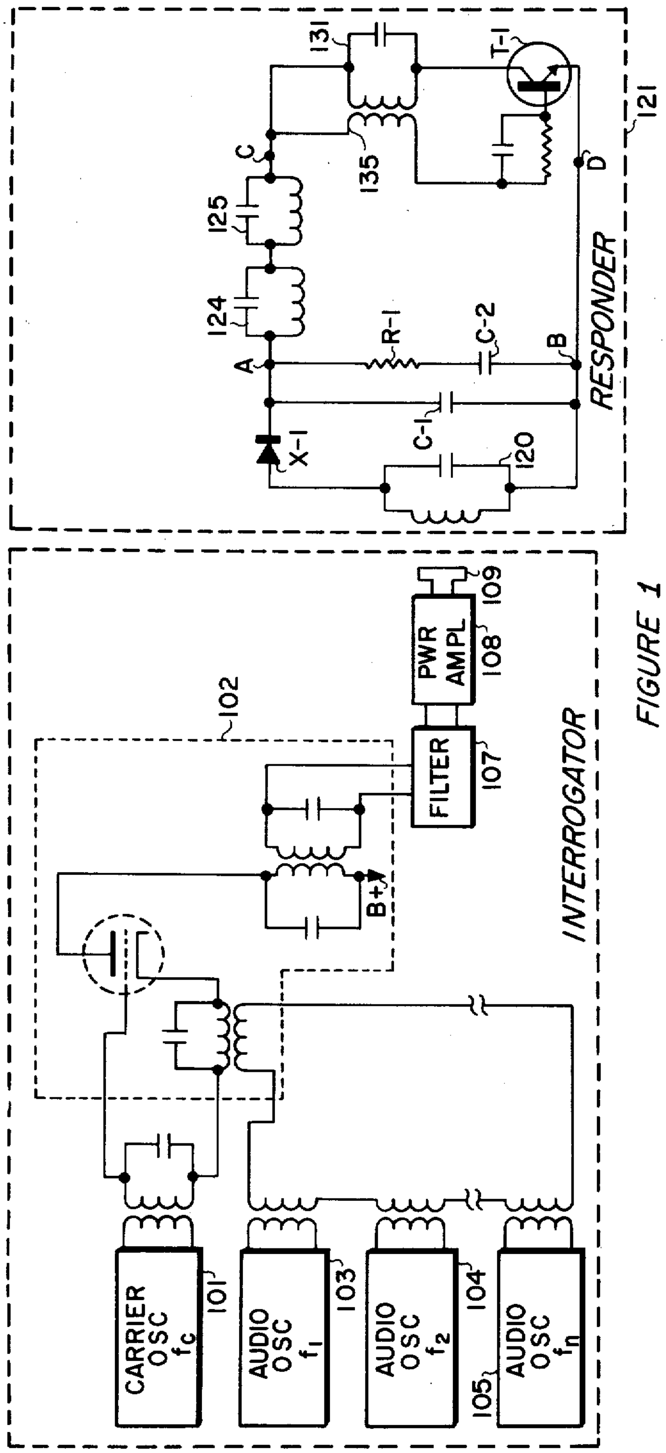
FIG. 1 is an electrical schematic diagram, partially in block form, illustrating how one well-known single sideband transmission scheme may be applied to the basic passive signalling system of application Ser. No. 739,909.

FIG. 1 illustrates the basic system of application Ser. No. 739,909 modified in accordance with known SSB techniques to provide SSB transmission. A carrier frequency $f_c$ is generated by carrier oscillator 101 and coupled into the carrier input circuit of a classical van der Bijl modulator shown within dashed lines at 102. The plurality of audio sub-carriers intended to be amplitude modulated on carrier $f_c$ is generated by a plurality of audio oscillators 103, 104, 105, the output signals of which are superimposed by connection in series, and inserted into the grid-cathode circuit of modulator 102. While three audio oscillators are shown in FIG. 1, many more are usually used, a typical embodiment of the prior system employing perhaps fifteen channels or digits, so that fifteen audio oscillators would be required.

The output of modulator 102 is a conventional double sideband amplitude modulated signal. If $f_n$ is the highest of the audio frequencies to be impressed as a sub-carrier on carrier $f_c$, the output signal from modulator 102 will extend from a low limit of $(f_c-f_n)$ to an upper limit of $(f_c+f_n)$, hence having a width of $2f_n$. In order to eliminate the lower sidebands filter 107 is provided, to pass frequencies between $(f_c+f_n)$, and to reject frequencies between just below $f_c$ and $(f_c-f_n)$. The carrier and upper sidebands then are amplified in a conventional power amplifier 108 and then applied to the interrogator output coil 109, which induces power into responders as they pass nearby. Numerous other modulators might well be used in lieu of the van der Bijl modulator, examples being plate modulation or grid bias modulation or cathode circuit modulation of class C amplifiers.

Figure 2:
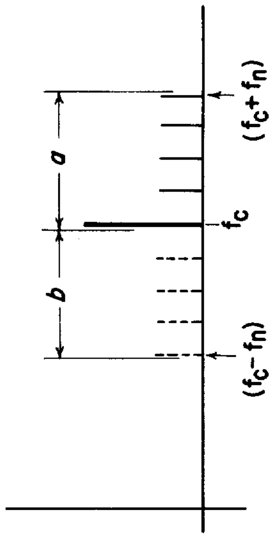
FIG. 2 is a graph illustrating the character of the single sideband signal applied to the output coil of the system of FIG. 1.

FIG. 2 is a graph of the frequency spectrum of the signal applied to power amplifier 108, showing the single sideband output in solid lines and the filtered lower sideband in dashed lines. Dimension "*a*" illustrates the width of the band containing the carrier and the upper sideband which is applied to amplifier 108 and the output coil, while dimension "*b*" illustrates the width of the lower sideband, which is filtered out by filter 107.

The output coil 109 creates a field which induces power and signal voltages into each responder as it moves into the effective field of coil 109. Using the SSB signal from the interrogator unit of FIG. 1, the resonant tank 120 of the responder shown at 121 should be tuned to encompass the carrier and upper sidebands. The modulated carrier voltage present across tuned circuit 120 is demodulated by means of diode rectifier X–1, and capacitor C–1, thereby providing a composite sub-carrier signal containing all of the audio frequencies generated by the interrogator audio oscillators, with the composite sub-carrier signal superimposed on a direct voltage derived from demodulation of the carrier $f_c$. A series RC circuit comprising resistor R–1 and capacitor C–2 may be used to avoid clipping and cross-modulating of the sub-carrier signals, in accordance with a technique explained in my copending application Ser. No. 850,828 filed November 4, 1959.

The composite voltage between terminals A and B is coded by means of one or more low frequency or audio filters, such as 124 and 125, which are tuned to a selected two of the audio sub-carrier frequencies to remove them from the voltage applied to a response oscillator. The direct component voltage will be seen to be applied through response oscillator tank circuit 131 across the collector-emitter circuit of transistor T–1, thereby causing current flow through the transistor and tank circuit. Since the voltage between terminals C and D contains all of the audio sub-carriers except those filtered out by filters 124 and 125, the response signal emanating from response oscillator 130 will be modulated with all audio sub-carriers except those filtered out within the responder unit. The response oscillator 130 shown is exemplary only. Tank circuit voltage is regeneratively fed back to the base of transistor T–1 via tickler coil 135 to sustain oscillation, which occurs at a carrier frequency determined by the constants of tuned circuit 131.

When any responder is located away from the interrogator coil more than a certain distance, the signals induced in the responder input circuit 120 are too weak to power the response oscillator to enable it to oscillate. At some closer location oscillation will occur, but response signals may be weak, intermittent or unreliable. At nearer locations ample power will be induced in each responder to insure adequately powerful response signals. By means of automatic gain control techniques shown in detatil in previous applications, response signals are ignored until they exceed a desired threshold.

Figure 3:
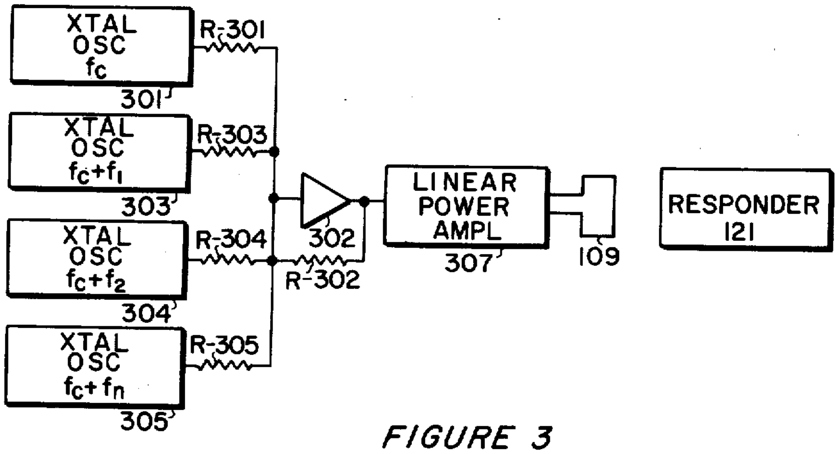
FIG. 3 is an electrical schematic diagram, partially in block form, illustrating how the present invention may be utilized to provide a synthetic SSB signal for use with the basic signalling system of application Ser. No. 739,909.

Referring now to FIG. 3, and recalling that a continuous band of spectrum is unnecessary to operate the signalling system of application Ser. No. 739,909, it may be observed that an extremely simple and improved interrogator may be used, to provide exactly the same signal to the interrogator output coil as was provided by the apparatus of FIG. 1. Since the sub-carriers in such a signalling system are known and unvarying, consisting of discrete and separate audio frequencies, the single sideband signal of FIG. 2 may be produced in the manner shown in FIG. 3, with advantages to be mentioned. In FIG. 3 the discrete frequency components which make up the SSB signal are generated directly by crystal oscillators 301, 303, 304 and 305, which can be precisely controlled and which can be provided with better accuracy and freedom from drift than can audio oscillators. Furthermore, radio frequency oscillators use much smaller and lighter components in their tuned circuits, and provision of a desired Q is much easier with a radio frequency circuit than with an audio or low frequency circuit. Thus while the carrier frequency oscillator 101 of FIG. 1 may be identical to the carrier frequency oscillator 301 of FIG. 3, the audio oscillators 103, 104 and 105 of FIG. 1 are replaced by crystal-controlled radio frequency oscillators 303, 304 and 305 in FIG. 3.

A patent application Serial No. 15,914 entitled "Crystal Controlled Transistorized Oscillator" filed on March 18, 1960 by Clarence S. Jones and John Scarbrough fully describes an oscillator circuit which is contemplated for use as the oscillators 301, 303, 304 and 305 in FIG. 3.

The output signals from the oscillators in FIG. 3 are all summed together in a conventional summing circuit shown herein as comprising a conventional feedback amplifier 302 having feedback impedance R–302. Summing or scaling resistors R–301, R–303, R–304 and R–305 are selected relative to each other to proportion properly the relative amplitudes of carrier frequency and sideband frequencies in order to provide the desired percentage of modulation in the output signal. As mentioned above, no modulator stage is required with the circuitry of FIG. 3. From the output terminals of amplifier 302 the single sideband signal is fed through a conventional linear power amplifier 307 (linear in order to preserve relative sideband-carrier amplitudes), where it is amplified, and then applied to feed the interrogator output coil 109. The SSB signal provided by the apparatus of FIG. 3 may be identical in content to that provided by the apparatus of FIG. 1, and hence responder 121, shown in block form in FIG. 3 will respond in the same manner as described above in connection with FIG. 1, although the more precise frequency cont'ol economically possible with the RF crystal oscillators of FIG. 3 will aid the responder to produce more powerful and reliable response signals.

A specific embodiment designed in accordance with principles of FIG. 3 is intended to utilize 90 kc. as the interrogator carrier frequency, and radio frequencies of 90.5, 90.590 and 92.195 kilocycles are generated and summed to drive the interrogator coil. The responder input tuned circuit receives the band from 90 kc. to 92.195 kc., and powers a response oscillator having a carrier frequency of 235 kc. A double sideband amplitude-modulated response receiver system tuned to a center frequency of 235 kc. with an input pass band from 232.8 kc. to 237.2 kc. reproduces the sub-carriers as the following audio frequencies, which it will be observed, are staggered so as not to be harmonically related to each other: 500; 590; 695; 820; 965; 1140; 1340; 1580; 1865; and 2195.

Although it can be used with responders of the type shown in FIG. 1, the invention is most advantageously used to provide SSB signals for responders of an improved type shown in appl. Ser. No. 8,723 filed on February 15, 1960, by myself and Clarence S. Jones for "Improved Responder Device." It should be recognized that demodulation of a carrier frequency and various sideband frequencies in a linear detector will result in some distortion if single rather than double sideband transmission is used, and hence the responder of FIGS. 1 and 3 will introduce some distortion in the audio subcarriers eventually modulated on the response carrier. The distortion may be made very slight if percentage modulation is kept small, and in most applications of the invention the distortion introduced is in no way critical. In the specific embodiment mentioned above, an instantaneous peak percentage of modulation of 45% (R.M.S. modulation: 11.6%) could be regarded as typical. Such a percentage may be obtained by selection of the circuit scaling resistors, so that each of the 15 subcarrier signals are limited to 3% of the amplitude of the interrogator carrier.

While prior art SSB systems, as far as I am aware, always had all sideband frequencies on the same side of the carrier frequency, the present invention is not limited to such an arrangement. Thus, within the context of the present invention, a single sideband transmission system is meant to embrace systems where sidebands are not symmetrically disposed about the carrier, but where the sidebands of both higher and lower frequencies than the carrier may be present.

Figure 4:
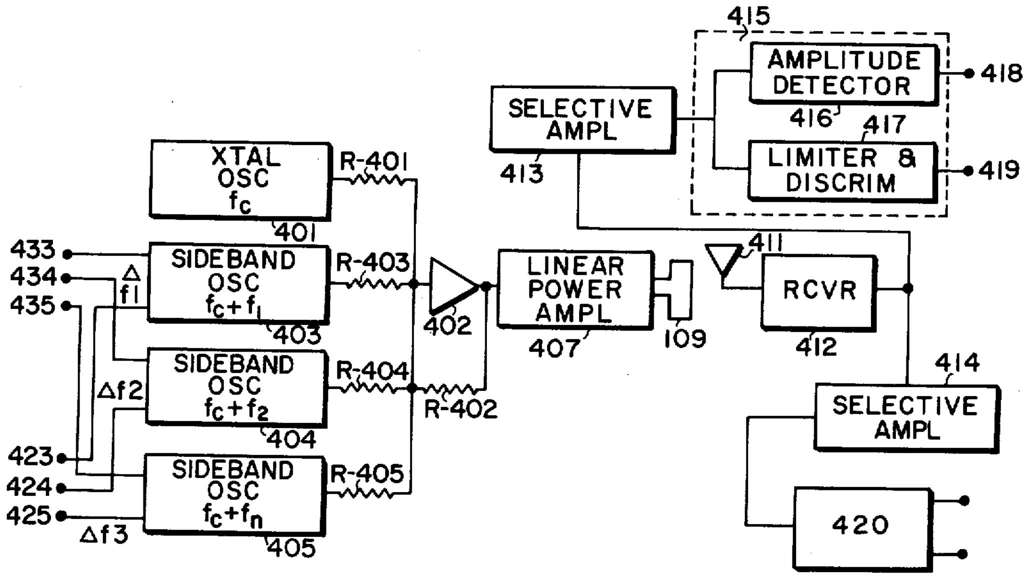
FIG. 4 is an electrical diagram partially in block form illustrating how the present invention may be utilized to provide an improved telemetry system.

As mentioned above the SSB transmission scheme of this invention is useful not only in connection with interrogator-responder signalling systems of the type described, but also useful in various forms of radio telemetry. FIG. 4 shows a SSB transmitter arrangement like that shown in FIG. 3, except that the oscillators 403, 404 and 405 are not crystal controlled at a fixed frequency, but made variable in frequency in accordance with three items of data to be transmitted by means of three voltages $\Delta f1$, $\Delta f2$ and $\Delta f3$ applied from three input terminals 423, 424, 425. The amplitudes of the output signals of oscillator circuits 403, 404 and 405 are controlled in accordance with the value of three further data channels, by means of three voltages applied from three input terminals 433, 434, and 435. Hence, both frequency modulation and amplitude modulation are imposed on the high frequency sidebands provided by oscillators 403, 404 and 405. Various methods of controlling oscillator amplitude and frequency in accordance with variable input voltages are known and need not be shown in detail herein. The frequency and amplitude modulated signals from sub-carrier oscillators 403, 404 and 405 and the unmodulated signal from carrier frequency oscillator 401 are applied through scaling resistors R–401, R–403, R–404 and R–405 to feedback summing amplifier 402, providing a SSB signal, which is amplified in linear power amplifier 407 and then applied to the system output inductor, antenna 109. The signal picked up by receiving antenna 411 is amplified, and heterodyned, if desired, in receiver 412 and then applied to a group of selective amplifiers, only two (413, 414) of which are shown in FIG. 4. Each selective amplifier is designed to cover the frequency band utilized by one of the sideband oscillators. For example, selective amplifier 413 is arranged to amplify the band between $(f_c+f_1+\Delta f_1)$ and $(f_c+f_1-\Delta f_1)$, selective amplifier 414 is arranged to amplify the band between $(f_c+f_2+\Delta f_2)$ and $(f_c+f_2-\Delta f_2)$, etc. The output of each selective amplifier is applied to an amplitude detector, such as 416, to recover the amplitude modulation, and to conventional limiter and frequency discriminator circuitry to recover the frequency modulation. The amplitude modulation applied to oscillator 403 from terminal 433 and the frequency modulation applied to oscillator 403 from terminal 423 will appear as output signals at terminals 418 and 419, respectively.

It should be noted that simultaneous use of amplitude and frequency modulation of the sideband oscillators inherently results in some cross-modulation. The amount of cross-modulation will be minimized by minimizing percentage amplitude modulation and the frequency modulation swing or deviation from center frequency of each oscillator. For many practical applications the modulations may be selected so that cross-modulation will be 30 db below the information signal level, thereby providing a single economical and highly useful multi-channel telemetering system.

What is claimed is:

1. An interrogator-responder signalling system, comprising in combination: an interrogator unit for producing and transmitting an interrogator signal, said unit comprising a first oscillator of fixed carrier frequency and a plurality of sideband oscillators having fixed respective frequencies, the frequencies of each of said sideband oscillators differing from said carrier frequency by a respective sub-carrier frequency, scaling and summing means for combining the output signals from each of said oscillators to provide a single sideband signal, the signal from said carrier frequency oscillator being scaled to be greater in amplitude than the signal from any of said sideband oscillators, and a transmitter output inductor excited by said single sideband signal; and a plurality of passive responder units relatively movable with respect to said interrogator unit, each responder unit being responsive to said single sideband signal and operative to provide a response signal comprising a response carrier modulated with a plurality of said sub-carrier frequencies, each responder unit comprising tuned circuit means tuned to receive a band including the frequencies of each of said oscillators, demodulation means connected to said tuned circuit means and operative when the responder approaches within a certain distance to said interrogator output inductor to provide a first composite signal having a direct component and a plurality of sub-carrier components, filter circuit means responsive to said first composite signal and operative to provide a second composite signal having coded sub-carrier components unique to an individual responder unit, and a response oscillator operated by said second composite signal for providing a response carrier signal modulated in accordance with said coded sub-carrier components.

2. Apparatus according to claim 1 in which each of said oscillators comprises a crystal-controlled fixed frequency oscillator, and in which said scaling and summing means comprises a feedback amplifier scaling and summing circuit, said apparatus also including a linear power amplifier coupled to amplify said single sideband signal from said scaling and summing means and to apply the amplified signal to said transmitter output inductor.

3. Apparatus according to claim 1 in which the frequency of at least one of said sideband oscillators differs from the frequency of said first oscillator by an amount that is different than the difference between the frequency of any other of said sideband oscillators and the frequency of said first oscillator.

4. Apparatus according to claim 1 in which the frequency of each of said sideband oscillators differs from the frequency of said first oscillator by a different amount.

5. A single sideband transmitter unit, comprising in combination: a first oscillator for providing a carrier signal of fixed carrier frequency; a plurality of sideband oscillators having fixed respective frequencies, the frequencies of each of said sideband oscillators differing from said carrier frequency by a respective sub-carrier frequency; a scaling and summing means for combining the output signals from each of said oscillators to provide a sum signal, said carrier signal being scaled to be greater in amplitude than the side band signal from any of said sideband oscillators and the scaling of said sideband signals being arranged relative to the scaling of said carrier to provide a desired percentage modulation; a linear power amplifier for amplifying said sum signal to provide an output signal; and an output inductor connected to said output signal.

6. A telemetering system, comprising in combination; a transmitter unit for transmitting a single sideband modulated signal, said unit including a crystal-controlled fixed frequency oscillator for providing a transmitter carrier frequency signal, a plurality of variable-frequency variable-amplitude oscillator means each controlled within respective frequency bands by a respective data input signal and each controlled in amplitude by a further respective data input signal, said oscillator means each being operative to provide a respective sideband frequency signal varying in frequency and amplitude, scaling and summing means for combining said carrier frequency signal and said sideband frequency signals to provide a sum signal, said carrier signal being scaled to be greater in amplitude than the sideband signal from any of said oscillator means, a linear power amplifier for amplifying said sum signal to provide an output signal, and signal-radiating output inductor connected to said output signal; and a receiver unit from receiving said output signal, said receiver unit including a plurality of selective amplifiers arranged to amplify frequency bands corresponding to said respective frequency bands of said oscillator means, respective amplitude detector means responsive to each of said selective amplifiers for providing output voltages corresponding to said data input signals, and respective frequency-discriminator means responsive to each of said selective amplifiers for providing further output voltages corresponding to said further data input signals.

7. Apparatus according to claim 6 in which the center frequency of each of said oscillator means differs from the frequency of said fixed frequency oscillator by a different amount.

References Cited in the file of this patent

UNITED STATES PATENTS

| | | |
|---|---|---|
| 2,597,518 | Parks | May 20, 1952 |
| 2,640,973 | Cleaver et al. | June 2, 1953 |
| 2,730,696 | Davis | Jan. 10, 1956 |
| 2,753,550 | Treharne | July 3, 1956 |
| 2,904,682 | Rawlins | Sept. 15, 1959 |

OTHER REFERENCES

Publication: Electronics, "Three-Tone Oscillator Broadcasts Time Signal" by S. Feldman, pages 162, 163, September 1953.